(12) United States Patent
Utsuno et al.

(10) Patent No.: US 9,976,012 B2
(45) Date of Patent: May 22, 2018

(54) FLAME-RETARDANCE-IMPARTING MATERIAL AND FLAME-RETARDANT RESIN FORMED ARTICLE

(71) Applicants: Kitagawa Industries Co., Ltd., Aichi (JP); National Institute of Advanced Industrial Science and Technology, Tokyo (JP)

(72) Inventors: Yo Utsuno, Kasugai (JP); Ichinori Shigematsu, Nagoya (JP); Masako Seki, Nagoya (JP)

(73) Assignees: KITAGAWA INDUSTRIES CO., LTD., Aichi (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days. days.

(21) Appl. No.: 15/501,228

(22) PCT Filed: Aug. 20, 2015

(86) PCT No.: PCT/JP2015/073341
§ 371 (c)(1),
(2) Date: Feb. 2, 2017

(87) PCT Pub. No.: WO2016/027848
PCT Pub. Date: Feb. 25, 2016

(65) Prior Publication Data
US 2017/0218182 A1    Aug. 3, 2017

(30) Foreign Application Priority Data
Aug. 20, 2014 (JP) ................. 2014-167795

(51) Int. Cl.
*C08K 11/00* (2006.01)
*C09K 21/06* (2006.01)

(52) U.S. Cl.
CPC ............ *C08K 11/005* (2013.01); *C09K 21/06* (2013.01)

(58) Field of Classification Search
CPC .............................. C08K 11/005; C09K 21/06
USPC .......................................................... 524/15
See application file for complete search history.

(56) References Cited

U.S. PATENT DOCUMENTS

2013/0105746 A1*  5/2013  Carpanzano ......... A01G 9/1086
                                                              252/601

FOREIGN PATENT DOCUMENTS

| JP | 2005-329688 | 12/2005 |
| JP | 2010-174080 | 8/2010 |
| JP | 2011-241261 | 12/2011 |

OTHER PUBLICATIONS

International Search Report dated Nov. 17, 2015 in International Application No. PCT/JP2015/073341.
International Preliminary Report on Patentability dated Oct. 12, 2016 in International Application No. PCT/JP2015/073341, with English translation.
Written Opinion of the International Searching Authority dated Oct. 12, 2016 in International Application No. PCT/JP2015/073341, with English translation.
International Preliminary Report on Patentability dated Oct. 25, 2016 in International Application No. PCT/JP2015/073341, with English translation.
Written Opinion of the International Searching Authority dated Nov. 17, 2015 in International Application No. PCT/JP2015/073341, with English translation.

* cited by examiner

*Primary Examiner* — Hui Chin
(74) *Attorney, Agent, or Firm* — Wenderoth, Lind & Ponack, L.L.P.

(57) ABSTRACT

A method for producing a flame-retardance-imparting material comprises: a shredding step of shredding plant material containing stems and/or leaves of tomato plants and/or eggplant plants in a aqueous solvent; and an aqueous solvent removal step or removing the aqueous solvent from the plant material after shredding.

12 Claims, No Drawings

FLAME-RETARDANCE-IMPARTING MATERIAL AND FLAME-RETARDANT RESIN FORMED ARTICLE

TECHNICAL FIELD

The present invention relates to a flame-retardance-imparting material and a flame-retardant resin formed article.

BACKGROUND ART

Plant remnants that are unnecessary after the edible portions have been harvested or the effective ingredients have been extracted are nearly all discarded as agricultural waste. Since they are generated in large quantities each year, the economic burden on businesses is also large, and the burden on the environment also cannot be ignored.

To reduce the amount of waste, there have been attempts to recycle plant remnants that are currently discarded as waste into industrial materials by making use of materials processing technology developed in industry (for example, refer to Patent Document 1).

CITATION LIST

Patent Literature

Patent Document 1: Japanese Unexamined Patent Application Publication No. 2005-329688A

Technical Problem

Patent Document 1 discloses a method for producing food tray containers using a material obtained by adding a binder consisting mainly of a thermoplastic resin to pulverized plant waste such as husks of grains such as rice husks, rush, thinned wood, and the like.

On the other hand, there has been demand recently for use of plant waste in applications other than food containers, such as consumer electronics and automotive parts, and functions aligned with particular applications have also been demanded.

In general, consumer electronics parts and automotive parts made from resin or the like require flame retardance. The method generally used at present is to add a flame retardant to a resin to impart flame retardance. Flame retardants include organic flame retardants such as bromine compounds, and inorganic flame retardants such as antimony compounds and aluminum hydroxide.

The use of antimony-based and halogen-based flame retardants has been curbed recently due to environmental concerns. Additionally, since the addition of flame retardants causes costs to rise, there is a trend toward reducing the amount used to as little as possible.

From this background, there is a strong desire for the development of novel flame-retardance-imparting materials and flame-retardant resin formed articles that are inexpensive and can reduce the added amount of chemical flame retardants.

SUMMARY OF INVENTION

The present invention was achieved based on the above circumstances, and an object of the present invention is to provide a flame-retardance-imparting material and a flame-retardant resin formed article that utilize plant waste.

Solution to Problem

As a result of diligent research to solve the above problems, the present inventors obtained the finding that flame retardance is imparted by using a material obtained by contacting a plant material selected from plants and plant-derived materials with an aqueous solvent and then removing the aqueous solvent. The present invention is based on this new finding.

That is, the present invention is a flame-retardance-imparting material obtained by contacting a plant material selected from plants and plant-derived materials with an aqueous solvent and then removing the aqueous solvent.

Furthermore, the present invention is a flame-retardant resin formed article including a resin composition containing a flame-retardance-imparting material obtained by contacting a plant material selected from plants and plant-derived materials with an aqueous solvent, and a resin.

In the present invention, the detailed reasons that a material that imparts flame retardance is obtained by contacting a plant material selected from plants and plant-derived materials with an aqueous solvent are unknown, but the following three reasons are considered.

(1) Low-molecular-weight organic compounds having a low decomposition temperature (are easily combusted) are removed.

(2) High-molecular-weight organic compounds such as cellulose having a high decomposition temperature are not removed, and the content thereof in the material increases relatively.

(3) Inorganic components that contribute to combustion are removed, and inorganic components that contribute to flame retardance remain.

When the plant material is contacted with an aqueous solvent, water-soluble components such as low-molecular-weight carbohydrates contained in the plant material are removed. On the other hand, it is thought that due to removing low-molecular-weight organic components such as carbohydrates, the content of high-molecular-weight organic compounds such as cellulose contained in the plant material increases relatively, and a material that can impart flame retardance is thereby obtained.

Additionally, potassium carbonate contained in ash after combustion of plants is an auxiliary combustion catalyst which accelerates combustion. Although an extremely large amount of potassium is present in plant materials, the majority thereof can be removed by contacting them with an aqueous solvent.

On the other hand, calcium compounds and phosphorus compounds are components that increase flame retardance and are also used in some flame-retardance-imparting agents. Calcium and phosphorus are present in plant materials and do not decrease relatively even after contact with an aqueous solvent.

Therefore, the present invention can provide a flame-retardance-imparting material and a flame-retardant resin formed article that utilize plant waste.

Advantageous Effects of Invention

The present invention can provide a flame-retardance-imparting material and a flame-retardant resin formed article that utilize plant waste.

DESCRIPTION OF THE EMBODIMENTS

The flame-retardance-imparting material of the present invention is a material obtained by contacting a plant material selected from plants and plant-derived materials with an aqueous solvent and then removing the aqueous solvent that contacted the plant material.

In the present invention, "plants" means plants themselves as well as plants after the edible portions or portions for medicine have been harvested. "Plant-derived material" means components extracted from a plant or the matter obtained after the useful components and the like have been extracted from a plant. In the present invention, "plant material" means a material selected from plants and plant-derived materials.

Examples of the plants used in the present invention include plants after the edible portions or the portions for medicine have been harvested, and unaltered plants. Examples of the plant-derived materials used in the present invention include components extracted from a plant or the matter obtained after the useful components such as essential oils and alkaloids have been extracted from a plant. One type or combinations of two or more types may be used as the plants and plant-derived materials.

Examples of the plant material used in the present invention include the waste portions of edible plants such as tomato, eggplant, cucumber, bell pepper, and mandarin orange; algae; resource crops (inedible crops primarily used as energy resources such as rapeseed); inedible plants such as bagasse, rice straw, rice husks, bamboo and thinned wood; and unutilized parts of plant-based materials produced from food-related businesses and timber processing-related businesses (for example, "chips" and the like generated from timber processing-related businesses).

Among these, waste such as stems, leaves, and roots after the edible fruits have been harvested from a tomato plant is preferred, and waste that includes tomato stems is particularly preferred from the viewpoint of a high flame-retardance-imparting effect.

The water-soluble components removed by contact with an aqueous solvent are water-soluble components contained in the plants. Examples of organic matter include carbohydrates such as monosaccharides such as glucose, disaccharides, and polysaccharides, plant enzymes, and amino acids. Examples of the inorganic matter include potassium.

In the present invention, contact with the aqueous solvent may be performed after the shredding process in which the plant material is shredded. This is preferred because the aqueous solvent contacts the shredded portion of the plant material produced by the shredding process, making it easier to remove water-soluble components. It is also preferred because when the shredding process is performed before the process of contacting with an aqueous solvent (aqueous solvent contact process), the plant material can be compactly contained in cases where it must be stored before the contact process.

The shredding process is the process by which plant material is shredded without using an aqueous solvent. There are various shredding processes, such as a method by cutting into chunks using a knife, a method by crushing or striking by applying pressure using a ball mill or the like, and blasting. In the shredding process, the plant material may also be crushed into pieces by applying force to a degree that destroys cell walls.

In the present invention, examples of the aqueous solvent include one type or a mixture of two or more types of aqueous solvents such as water, methanol, ethanol, propanol, formic acid, acetic acid, or the like, alkaline solvents, buffer solutions, and the like. Water is preferred as the aqueous solvent. As the water, pure water, purified water, tap water, and the like may be used.

Specific examples of methods for contacting the plant material with the aqueous solvent include a method of shredding the plant material in the aqueous solvent (shredding in water), and a method of allowing the aqueous solvent to flow over the plant material before or after shredding. Among these methods, shredding the plant material in the aqueous solvent is preferred because water-soluble components are easily removed from the shredded portion produced by shredding of the plant material.

In the contact process in which the plant material and the aqueous solvent are put in contact, the aqueous solvent and the plant material may be put in contact by immersing the plant material in the aqueous solvent collected in a container, or the aqueous solvent and plants may be put in contact while the aqueous solvent is made to flow, or the vaporized aqueous solvent may be put in contact with the plants and coagulated.

After putting the plant material and the aqueous solvent in contact, a sterilization process may be performed by a method such as electromagnetic waves, temperature, pressure, or pharmacological treatment. A sterilization process is preferred because it prevents generation of bacteria and can prevent generation of foul odors and quality degradation in the flame-retardance-imparting material.

Solidification (aqueous solvent removal process) is performed to remove the aqueous solvent from the plant material that has been contacted by the aqueous solvent, and a flame-retardance-imparting material is thereby obtained. As the method of aqueous solvent removal and solidification, drying the plant material as-is by heating at high temperature in a hot dryer is preferred. A drying process by drying the plant material may also be performed. The drying process may be carried out by a method such as hot drying, air drying, or freeze drying. By reducing the moisture content in the flame-retardance-imparting material, bacterial growth, chemical reactions accompanying enzymes, and oxidation reactions due to oxygen in the air can be suppressed.

The above flame-retardance-imparting material may be pulverized to a shape and size suitable for storage or mixing with other materials. A micropulverizer or the like may be used when pulverization is performed.

The above flame-retardance-imparting material is a material having the function of imparting flame retardance to resin by being mixed with the resin and so forth.

The flame-retardant resin formed article of the present invention includes a resin composition containing a flame-retardance-imparting material obtained by contacting a plant material selected from plants and plant-derived materials with an aqueous solvent and then removing the aqueous solvent, and a resin.

Examples of the resin contained in the resin composition together with the flame-retardance-imparting material include polyolefin resins such as polypropylene and polyethylene. The flame-retardance-imparting material is preferably contained in a proportion of not less than 20 mass % and not greater than 50 mass % relative to the mass of the resin composition. When the flame-retardance-imparting material is greater than 50 mass %, formation may be difficult, and when less than 20 mass %, flame retardance may be insufficient. In addition to the resin serving as the main component, various additives may also be added to the resin composition.

The advantageous effect of the invention will be described below.

According to the present invention, water-soluble components such as carbohydrates in plant material can be removed by contacting the plant material with an aqueous solvent. It is thought that, as a result, the ratio of cellulose increases relatively, the content of cellulose in the plant material increases relatively, and a material that can impart flame retardance is obtained. This is thought to be because inorganic components that contribute to combustion are removed while inorganic components thought to contribute to flame retardance (calcium, phosphorus, and the like) remain.

Therefore, the present invention can provide a flame-retardance-imparting material and a flame-retardant resin formed article that utilize plant waste.

EXAMPLES

The present invention will be described in further detail below through examples.
(1) Production of Material (Plant Material)
(A) Matter consisting of stems and leaves of tomato plants after the fruits had been harvested which had been cut to a size of approximately 1 cm using a coarse pulverizer (manufactured by Horai Co., Ltd.) was used as precursor A. This precursor A underwent drying treatment (130° C. for 8 hours, followed by 105° C. for 12 hours), and it was further pulverized to approximately 500 μm using a micropulverizer (manufactured by Osaka Chemical Co., Ltd.), to produce material A.

(B) 500 g of material A obtained by cutting stems and leaves of tomato plants after the fruits had been harvested to a size of approximately 1 cm using a coarse pulverizer (manufactured by Horai Co., Ltd.) was put in 2 L of water and shredded for 2 minutes with a homogenizer and then filtered. The obtained filter residue was repeatedly treated 3 times in the same manner, to produce precursor B. This precursor B underwent drying treatment (130° C. for 8 hours, followed by 105° C. for 12 hours), and it was further pulverized to approximately 500 μm using a micropulverizer (manufactured by Osaka Chemical Co., Ltd.), to produce material B.

(C) Material obtained by pulverizing rice husks to approximately 500 μm using a micropulverizer (manufactured by Osaka Chemical Co., Ltd.) was used as material C.

Furthermore, it was ascertained that these materials A and B and the substances before materials A and B were micropulverized contained submicron or nanosize fibrous matter (cellulose nanofibers and the like) having a dimension less than a micron, such as cellulose which is a constituent component thereof. In particular, it was ascertained that the content of the above fibrous matter was high in materials A and B which had undergone micropulverization and in the substance before material B had been micropulverized.
(2) Production of Resin Formed Article Materials A, B, and C were each kneaded (180° C., 10 minutes) with polypropylene (PP) (random type polypropylene, SunAllomer PMA20V, manufactured by SunAllomer, Ltd.) in a ratio of 50 mass % using a melt kneader, and then the resulting substance was formed (180° C., 10 minutes) into a sheet (125 mm×13 mm×2 mm) using a hot press, and sheet-like resin formed articles A, B, and C were produced.

Furthermore, 50 mass % of the above PP and 50 mass % of cellulose (powder passing through 38 μm (400 mesh), manufactured by Wako Pure Chemical Industries Ltd.) were kneaded using a melt kneader, and then the resulting substance was formed (180° C., 10 minutes) into a sheet (125 mm×13 mm×2 mm) using a hot press, and sheet-like resin formed article D was produced.

Additionally, resin formed article E formed into a sheet using a hot press using only the above PP (SunAllomer PMA20V) was also produced.
(3) Combustion Test The resin formed articles A, B, C, D, and E were set in a jig and ignited by contacting an end of the resin formed article for 30 seconds with the flame of a burner. At the point when 1 minute had elapsed after combustion of a benchmark located 25 mm from the end, the flame was extinguished and the combustion position was measured. The results are shown in Table 1. As the jig, a simple combustion test jig (conforming to UL94HB) was used. The gas flow rate of the burner was 105 mL/min, and the flame size was 20±1 mm.
(4) Measurement of Total Carbohydrate Concentration in Materials 0.5 g each of materials A and B before kneading with PP were immersed in 5.0 mL of water, and shaken at 180 rpm for 2 hours at 25° C. After shaking, the samples were centrifuged for 10 minutes at 3000 rpm, and the obtained supernatant was used as extracted water. The total carbohydrate concentration in the extracted water was measured by the phenol-sulfuric acid method based on a glucose standard. Results are shown in Table 1.
(5) X-Ray Fluorescence Analysis of Material Ash Content X-ray fluorescence analysis of the ash content of materials A and B was performed (analysis conditions: 50 kV, 60 mA) using a Rigaku ZXS Primus II (wavelength dispersive X-ray fluorescence analyzer). As a result, a large amount of potassium and phosphorus were present in material A, but potassium decreased greatly in material B. Phosphorus was also lower but remained relatively. As substantially no magnesium or calcium eluted out, their content ratios increased relatively. Furthermore, it was confirmed that sulfur was lower in material B than in material A.

TABLE 1

| Resin formed article | Materials used in production of resin formed article | | | | Total carbohydrate concentration (mg/g) | Combustion rate (mm/min) |
|---|---|---|---|---|---|---|
| | Plant material | | | | | |
| | Material | Plant (treatment method) | Proportion | PP | | |
| A | A | Tomato stems and leaves (none) | 50 | 50 | 58.6 | 50.7 |
| B | B | Tomato stems and leaves (shredded in water) | 50 | 50 | 4.7 | 38.3 |
| C | C | Rice husks (none) | 50 | 50 | — | 70.8 |
| D | Cellulose | | 50 | 50 | — | 42.1 |
| E | — | | 0 | 100 | — | 72.4 |

As is clear from the results shown in Table 1, the combustion rates of resin formed articles A and B produced using the materials (materials A and B) obtained from tomato plants, resin formed article C produced using material C obtained from rice husks, and resin formed article D produced by kneading in cellulose were all slower than the combustion rate of resin formed article E produced from PP only. Thus, it can be said all of these materials have the effect of suppressing the combustion rate of PP, although they differ in degree.

Among resin formed articles A and B produced using material obtained from tomato plants (materials A and B), the combustion rate of resin formed article A, which used material that had not been shredded in water, was approximately 50 mm/min, and was at least 20 mm/min slower than the combustion rate of resin formed article E produced from PP only. This demonstrates that tomato stems and leaves themselves contain elements with high flame retardance to begin with.

Additionally, the combustion rate of resin formed article B, which used material that had been shredded in water, was another 12 mm/min slower than that of resin formed article A, indicating that it has further improved flame retardance. This is thought to be because the easily combustible components or tissues contained in tomato stems and leaves were removed by shredding in water. This can also be inferred from the fact that the total carbohydrate concentration dropped to 1/10 or less.

The combustion rate of resin formed article D produced by kneading in pure cellulose alone was approximately 30 mm/min slower than that of resin formed article E produced from PP alone, and exhibited a certain degree of flame retardance.

However, the combustion rate of resin formed article B produced from material obtained by shredding tomato stems and leaves in water was another 4 mm/min slower than that of resin formed article D produced from pure cellulose, and exhibited higher flame retardance. This is thought to be because cellulose, which is the main component of the material shredded in water, contributes to flame retardance and also because flame-retardant elements (phosphorus and the like) remain in the material even after shredding in water.

As described above, tomato stems and leaves have elements high in flame retardance to begin with, but it was found that by contacting the plant materials with water, such as by shredding them in water, the combustion rate can be slowed (flame retardance can be imparted). This is thought to be because the components that contribute relatively to combustion are removed and flame retardance further increases.

However, since the flame-retarding capability is higher than that of resin formed article D produced by kneading in pure cellulose, it can be inferred that elemental components that contribute to flame retardance other than the main component cellulose are relatively uninfluenced by contact of the plant material with water, and remain in the resin formed article.

Study of Number of Times Shredded in Water
(6) Production of Material (Plant Material)

Freeze-dried stems and leaves of tomato plants (product name "Momotaro Haruka") from which the fruits had been harvested that were cut to a size of approximately 1 cm using a coarse pulverizer (manufactured by Horai Co., Ltd.) were used as coarse pulverized material.

In 2 L of water, 500 g of the coarse pulverized material was put and shredded for 2 minutes using a homogenizer. After that, the shredded material was filtered, and filter residue was obtained. The filter residue after shredding in water underwent drying treatment (130° C. for 8 hours, followed by 105° C. for 12 hours), and it was further pulverized to approximately 500 μm using a micropulverizer (manufactured by Osaka Chemical Co., Ltd.), to produce material g1.

In 2 L of water, 500 g of this coarse pulverized material was put and shredded for 2 minutes using a homogenizer. After that, the shredded material was filtered, and filter residue was obtained. Then, the obtained filter residue was subjected twice to the shredding in water treatment and the filtration treatment described above. The filter residue after shredding in water three times underwent drying treatment (130° C. for 8 hours, followed by 105° C. for 12 hours), and it was further pulverized to approximately 500 μm using a micropulverizer (manufactured by Osaka Chemical Co., Ltd.), to produce material g3.

In 2 L of water, 500 g of this coarse pulverized material was put and shredded for 2 minutes using a homogenizer. After that, the shredded material was filtered, and filter residue was obtained. Then, the obtained filter residue was subjected five more times to the shredding in water treatment and the filtration treatment described above. The filter residue after shredding in water six times underwent drying treatment (130° C. for 8 hours, followed by 105° C. for 12 hours), and it was further pulverized to approximately 500 μm using a micropulverizer (manufactured by Osaka Chemical Co., Ltd.), to produce material g6.

In 2 L of water, 500 g of this coarse pulverized material was put and shredded for 2 minutes using a homogenizer. After that, the shredded material was filtered, and filter residue was obtained. Then, the obtained filter residue was subjected nine more times to the shredding in water treatment and the filtration treatment described above. The filter residue after shredding in water ten times underwent drying treatment (130° C. for 8 hours, followed by 105° C. for 12 hours), and it was further pulverized to approximately 500 μm using a micropulverizer (manufactured by Osaka Chemical Co., Ltd.), to produce material g10.

(7) Production of Resin Formed Article

Material g1 was kneaded (180° C., 10 minutes) with PP (random type polypropylene, SunAllomer PMA20V, manufactured by SunAllomer, Ltd.) in a ratio of 30 mass % using a melt kneader, and then the resulting substance was formed (180° C., 10 minutes) into a sheet (160 mm×13 mm×1 mm) using a hot press, and sheet-like resin formed article G1 was obtained.

Sheet-like resin formed articles G3, G6, and G10 (160 mm×13 mm×1 mm) were obtained by the same method as the above resin formed article G1 except that materials g3, g6, and g10 were respectively used instead of the above material g1.

A resin formed article Gp formed into a sheet (160 mm×13 mm×1 mm) using a hot press using only the above PP (SunAllomer PMA20V) was obtained.

(8) Combustion Test

A combustion test was conducted as described below using a simple combustion test jig (conforming to UL94HB). Specifically, resin formed article G1 was set in the jig such that the long direction coincided with the horizontal direction, and the short direction coincided with the vertical direction. The flame of a burner (flame size 20±1 mm, gas flow rate 105 mL/min) was put in contact for 30 seconds with one end in the long direction of resin formed article G1 to ignite it. At the point when 1 minute had elapsed after combustion of a benchmark located 25 mm from that end in the long direction, the flame was extinguished and the distance from the benchmark to the combustion position was measured. During the test, the room temperature was 26.0° C. and humidity was 73%. Combustion tests were conducted on resin formed articles G3, G6, G10, and Gp in the same manner as resin formed article G1. The measurement results are shown in Table 2.

TABLE 2

| Resin formed article | Materials used in production of resin formed article | | | | Combustion rate (mm/min) |
|---|---|---|---|---|---|
| | Material | Plant (treatment method) | Proportion | PP | |
| G1 | g1 | Tomato stems and leaves (shredded once in water) | 30 | 70 | 83.49 |
| G3 | g3 | Tomato stems and leaves (shredded 3 times in water) | 30 | 70 | 81.71 |
| G6 | g6 | Tomato stems and leaves (shredded 6 times in water) | 30 | 70 | 80.16 |
| G10 | g10 | Tomato stems and leaves (shredded 10 times in water) | 30 | 70 | 65.09 |
| Gp | — | | 0 | 100 | 83.61 |

As shown in Table 2, it was ascertained that as the number of times shredded in water increased, the combustion rate of the resin formed article decreased and flame retardance improved.

Plant Materials Other than Tomato Plants (9) Production of Material (Plant Material)

Freeze-dried stems and leaves of eggplant plants (product name "Senryo") from which the fruits had been harvested that were cut to a size of approximately 1 cm using a coarse pulverizer (manufactured by Horai Co., Ltd.) were used as coarse pulverized material.

In 2 L of water, 500 g of this coarse pulverized material was put and shredded for 2 minutes using a homogenizer. After that, the shredded material was filtered, and filter residue was obtained. Then, the obtained filter residue was subjected twice to the shredding in water treatment and the filtration treatment described above. The filter residue after shredding in water three times underwent drying treatment (130° C. for 8 hours, followed by 105° C. for 12 hours), and it was further pulverized to approximately 500 µm using a micropulverizer (manufactured by Osaka Chemical Co., Ltd.), to produce material h.

(10) Production of Resin Formed Article

Material h was kneaded (180° C., 10 minutes) with PP (random type polypropylene, SunAllomer PMA20V, manufactured by SunAllomer, Ltd.) in a ratio of 30 mass % using a melt kneader, and then the resulting substance was formed (180° C., 10 minutes) into a sheet (160 mm×13 mm×1 mm) using a hot press, and sheet-like resin formed article H was produced.

(11) Combustion Test

A combustion test was conducted as described below using a simple combustion test jig (conforming to UL94HB). Specifically, resin formed article H was set in the jig such that the long direction coincided with the horizontal direction, and the short direction coincided with the vertical direction. The flame of a burner (flame size 20±1 mm, gas flow rate 105 mL/min) was put in contact for 30 seconds with one end in the long direction of resin formed article H to ignite it. At the point when 1 minute had elapsed after combustion of a benchmark located 25 mm from that end in the long direction, the flame was extinguished and the distance from the benchmark to the combustion position was measured. During the test, the room temperature was 26.0° C. and humidity was 73%. The measurement results are shown in Table 3.

TABLE 3

| Resin formed article | Materials used in production of resin formed article | | | | Combustion rate (mm/min) |
|---|---|---|---|---|---|
| | Material | Plant (treatment method) | Proportion | PP | |
| H | h | Eggplant stems and leaves (shredded 3 times in water) | 30 | 70 | 82.57 |

As shown in Table 3, resin formed article H which used eggplant plants as a plant material had a slower combustion rate of the resin formed article and had improved flame retardance compared to the resin formed article produced from PP alone (resin formed article Gp in Table 2).

(12) X-Ray Fluorescence Analysis of Material Ash Content

X-ray fluorescence of the ash content of coarse pulverized eggplant material that had not been shredded in water was performed (analysis conditions: 50 kV, 60 mA) using a Rigaku ZXS Primus II (wavelength dispersive X-ray fluorescence analyzer). As a result, a large amount of potassium and phosphorus were present in the coarse pulverized material, but potassium decreased greatly in material h. Phosphorus was also lower but remained relatively. As substantially no magnesium or calcium eluted out, their content ratios increased relatively. Furthermore, it was ascertained that in material h, unlike the above case of tomato plants, sulfur increased more than in the coarse pulverized material that had not been shredded in water.

Resins Other than PP

(13) Production of Material (Plant Material)

Freeze-dried stems and leaves of tomato plants (product name "Momotaro Haruka") from which the fruits had been harvested that were cut to a size of approximately 1 cm using a coarse pulverizer (manufactured by Horai Co., Ltd.) were used as coarse pulverized material.

Material (micropulverized material) obtained by further pulverizing 500 g of the above coarse material to approximately 500 µm using a micropulverizer (manufactured by Osaka Chemical Co., Ltd.) was used as material i0.

In 2 L of water, 500 g of this coarse pulverized material was put and shredded for 2 minutes using a homogenizer. After that, the shredded material was filtered, and filter residue was obtained. Then, the obtained filter residue was subjected twice to the shredding in water treatment and the filtration treatment described above. The filter residue after shredding in water three times underwent drying treatment (130° C. for 8 hours, followed by 105° C. for 12 hours), and it was further pulverized to approximately 500 µm using a micropulverizer (manufactured by Osaka Chemical Co., Ltd.), to produce material i3.

(15) Production of Resin Formed Article

Material i3 was kneaded (180° C., 10 minutes) with ABS (acrylonitrile-butadiene-styrene, Cycolac 1001N manufactured by UMG ABS Ltd.) in a ratio of 30 mass % using a melt kneader, and then the resulting substance was formed (180° C., 10 minutes) into a sheet (160 mm×13 mm×1 mm) using a hot press, and sheet-like resin formed article I3 was obtained.

Sheet-like resin formed article I0 (160 mm×13 mm×1 mm) was obtained by the same method as the above resin formed article I3 except that material i0 was used instead of the above material i3.

A resin formed article Ia formed into a sheet (160 mm×13 mm×1 mm) using a hot press using only the above ABS (Cycolac 1001N) was obtained.

(16) Combustion Test

A combustion test was conducted as described below using a simple combustion test jig (conforming to UL94HB). Resin formed article I3 was set in the jig such that the long direction coincided with the horizontal direction, and the short direction coincided with the vertical direction. The flame of a burner (flame size 20±1 mm, gas flow rate 105 mL/min) was put in contact for 30 seconds with one end in the long direction of resin formed article I to ignite it. At the point when 1 minute had elapsed after combustion of a benchmark located 25 mm from that end in the long direction, the flame was extinguished and the distance from the benchmark to the combustion position was measured. Combustion tests were conducted on resin formed articles I0 and Ia in the same manner as resin formed article I. During the test, the room temperature was 26.0° C. and humidity was 73%. The measurement results are shown in Table 4.

TABLE 4

| Resin formed article | Materials used in production of resin formed article | | | | Combustion rate (mm/min) |
|---|---|---|---|---|---|
| | Material | Plant (treatment method) | Proportion | ABS | |
| I0 | i0 | Tomato stems and leaves (none) | 30 | 70 | 118.75 |
| I3 | i3 | Tomato stems and leaves (shredded 3 times in water) | 30 | 70 | 115.6 |
| Ia | — | | 0 | 100 | >160 |

As shown in Table 4, it was ascertained that in resin formed article I3 as well, which used ABS as the resin component, the combustion rate of the resin formed article decreased and flame retardance improved due to the fact that plant material that had been shredded in water was added. Furthermore, for resin formed article I0 as well, in which resin material that had not been shredded in water was added, the combustion rate was slower and flame retardance was improved compared to resin formed article Ia made from ABS alone, but its flame retardance was inferior to that of resin formed article I3, in which resin material that had been shredded in water was added. Note that the combustion rate of resin formed article Ia made from ABS alone was greater than 160 mm/min.

The invention claimed is:

1. A method for producing a flame-retardance-imparting material, the method comprising: a shredding step of shredding a plant material containing stems and/or leaves of tomato plants and/or eggplant plants in an aqueous solvent; and
    an aqueous solvent removal step of removing the aqueous solvent from the plant material after shredding.

2. The method for producing a flame-retardance-imparting material according to claim 1, wherein the shredding step and the aqueous solvent removal step are repeated a plurality of times.

3. The method for producing a flame-retardance-imparting material according to claim 1, wherein the method is performed until the plant material becomes submicron or nanosize fibrous matter.

4. A flame-retardant resin formed article comprising a resin composition containing a flame-retardance-imparting material obtained by the method for producing a flame-retardance-imparting material described in claim 1, and a resin.

5. The flame-retardant resin formed article according to claim 4, wherein the article contains from 20 to 50 mass % of the flame-retardance-imparting material relative to a mass of the resin composition.

6. The method for producing a flame-retardance-imparting material according to claim 2, wherein the method is performed until the plant material becomes submicron or nanosize fibrous matter.

7. A flame-retardant resin formed article comprising a resin composition containing a flame-retardance-imparting material obtained by the method for producing a flame-retardance-imparting material described in claim 2, and a resin.

8. The flame-retardant resin formed article according to claim 7, wherein the article contains from 20 to 50 mass % of the flame-retardance-imparting material relative to a mass of the resin composition.

9. A flame-retardant resin formed article comprising a resin composition containing a flame-retardance-imparting material obtained by the method for producing a flame-retardance-imparting material described in claim 3, and a resin.

10. The flame-retardant resin formed article according to claim 9, wherein the article contains from 20 to 50 mass % of the flame-retardance-imparting material relative to a mass of the resin composition.

11. A flame-retardant resin formed article comprising a resin composition contains a flame-retardance-imparting material obtained by the method for producing a flame-retardance-imparting material described in claim 6, and a resin.

12. The flame-retardant resin formed article according to claim 11, wherein the article contains from 20 to 50 mass % of the flame-retardance-imparting material relative to a mass of the resin composition.

* * * * *